(12) United States Patent
Le Gonidec et al.

(10) Patent No.: US 10,352,275 B2
(45) Date of Patent: Jul. 16, 2019

(54) TECHNICAL TESTING METHOD

(71) Applicant: SAFRAN AIRCRAFT ENGINES, Paris (FR)

(72) Inventors: Serge Le Gonidec, Vernon (FR); Sebastien Reichstadt, Asnieres/Seine (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 15/034,709

(22) PCT Filed: Oct. 30, 2014

(86) PCT No.: PCT/FR2014/052767
§ 371 (c)(1),
(2) Date: May 5, 2016

(87) PCT Pub. No.: WO2015/067878
PCT Pub. Date: May 14, 2015

(65) Prior Publication Data
US 2016/0273490 A1    Sep. 22, 2016

(30) Foreign Application Priority Data

Nov. 5, 2013   (FR) .................................... 13 60839

(51) Int. Cl.
*G01M 15/00*    (2006.01)
*F02K 9/96*    (2006.01)
(Continued)

(52) U.S. Cl.
CPC .................. *F02K 9/96* (2013.01); *F02K 9/00* (2013.01); *F04D 15/0088* (2013.01);
(Continued)

(58) Field of Classification Search
CPC ...................................... F02K 9/96; F02K 9/00
(Continued)

(56) References Cited

U.S. PATENT DOCUMENTS

2009/0151336 A1    6/2009   In
2013/0211768 A1    8/2013   Gerez et al.

FOREIGN PATENT DOCUMENTS

DE    10 2008 059 224 A1    6/2009
FR           2 751 410 A1    1/1998
(Continued)

OTHER PUBLICATIONS

International Search Report dated Jan. 9, 2015 in PCT/FR14/052767 Filed Oct. 30, 2014.
(Continued)

*Primary Examiner* — Jamel E Williams
(74) *Attorney, Agent, or Firm* — Oblon, McClelland, Maier & Neustadt, L.L.P.

(57) ABSTRACT

A field of test methods, and more particularly to a method for testing a device, the method including one operating stage corresponding to a stable value of one operating setpoint for the device and/or for a test bench for testing the device. The operating stage is finalized before a maximum duration threshold if a criterion associated with a set of physical parameters picked up during the operating stage is satisfied and if a confidence level associated with the set of physical parameters reaches at least a predetermined threshold.

21 Claims, 2 Drawing Sheets

(51) Int. Cl.
*F02K 9/00* (2006.01)
*G01M 15/05* (2006.01)
*F04D 15/00* (2006.01)

(52) U.S. Cl.
CPC ......... *G01M 15/05* (2013.01); *F05D 2260/80* (2013.01); *F05D 2260/83* (2013.01)

(58) Field of Classification Search
USPC ....................................................... 73/865.9
See application file for complete search history.

(56) References Cited

FOREIGN PATENT DOCUMENTS

| FR | 2751410 A1 * | 1/1998 | ............. F02P 17/00 |
|----|----|----|----|
| FR | 2 965 915 A1 | 4/2012 | |
| JP | 3-19755 A | 1/1991 | |
| JP | 2005-308712 A | 11/2005 | |
| JP | 2008-256405 A | 10/2008 | |
| JP | 2009-14390 A | 1/2009 | |

OTHER PUBLICATIONS

Office Action dated Sep. 4, 2018 in Japanese Patent Application No. 2016-551060, citing documents AO-AR therein, 4 pages (with English translation).

\* cited by examiner

TECHNICAL TESTING METHOD

BACKGROUND OF THE INVENTION

The present invention relates to a technical test method for testing a device and including operating the device in at least one operating stage that corresponds to a stable value of at least one operating setpoint for the device and/or for a test bench for testing the device.

In the field of technical testing, it is common practice to test devices at a plurality of different operating rates that are to be encountered while the device is in use, with this being for the purpose of characterizing the entire operating envelope of the device as completely as possible. Typically, during testing, this is done by following a sequence comprising a plurality of operating stages, with each operating stage being maintained for a predetermined duration that is considered as being sufficient for guaranteeing the quality of information about operating parameters of the device as obtained over the duration of this stage.

Nevertheless, running such a sequence of operating stages of predetermined duration can result in tests presenting an overall duration that is considerable. Unfortunately, and mainly for economic reasons, it is desirable to limit the overall duration of testing. In addition, adjusting the individual duration of each operating stage would make it possible to test a larger number of operating setpoint values, thereby enabling the operating envelope of the device subjected to testing to be characterized more completely.

OBJECT AND SUMMARY OF THE INVENTION

The technical test method described in the present disclosure seeks to remedy those drawbacks. In particular, this disclosure seeks to provide a technical test method that makes it possible to reduce the overall duration of a technical test and/or to increase the number of stages in a sequence of operating stages for the device under test, while maintaining the validity of the test.

In at least one implementation, this object is achieved by the fact that, during the technical test, which comprises at least one operating stage corresponding to a stable value of at least one operating setpoint for the device and/or for a test bench for testing the device, said operating stage is finalized before a maximum duration threshold if a criterion associated with a set of physical parameters picked up during the operating stage is satisfied and if a confidence level associated with said set of physical parameters reaches at least a predetermined threshold.

This second condition makes it possible to distinguish between situations in which the criterion is sufficiently reliable for it to be opportune to finalize the operating stage, and situations in which the criterion is not reliable, and which would thus not enable the operating stage to be shortened, even if the criterion is satisfied. In particular, an additional criterion for finalizing said operating stage before a maximum duration threshold may be that said criterion is satisfied and that said confidence level has reached at least said predetermined threshold, for at least some predetermined minimum duration, in order to avoid some transient fluctuation in a physical parameter of said set of parameters triggering premature interruption of the operating stage.

In this context, the term "set of physical parameters" should be understood broadly, and can thus comprise a single physical parameter. Nevertheless, said set of physical parameters may comprise a plurality of physical parameters each associated with a respective confidence level, the confidence level associated with the set of physical parameters as a whole being a function of the confidence levels associated with said plurality of physical parameters. Thus, the reliability of each of the physical parameters may be weighted depending on the importance of the physical parameter in calculating the confidence level that is associated with the plurality of physical parameters and that authorizes the transition to the following operating stage. By way of example, said function may comprise the product of multiplying together the confidence levels associated with two physical parameters of said plurality, and/or subtracting the product of multiplying together the confidence levels associated with two physical parameters of said plurality from the sum of the same two confidence levels. In fuzzy logic, the product of two truth values corresponds to the probabilistic t-norm operator, whereas subtracting the product of two truth values from the sum of the same two truth values corresponds to a probabilistic t-conorm operator.

In order to match the confidence level corresponding to each physical parameter to the available information about the reliability of that physical parameter, the confidence level may in particular be predetermined, or calculated as a function of a noise level, and/or as a function of an asymmetric uncertainty coefficient in a signal corresponding to the associated physical parameter during a moving time window, and/or a difference between a value of the associated physical parameter and a predetermined threshold.

In order to be able to apply the principles of fuzzy logic to processing confidence levels, each of said confidence levels may have a value lying in the range 0 to 1.

In order to be able to test the device at a plurality of different operating rates, the method may comprise a sequence of a plurality of different operating stages, each corresponding to a stable value of at least one operating setpoint for a device subjected to testing and/or for a test bench for testing the device. The order of the operating stages in said sequence may be established on the basis of at least one priority assigned to each operating stage, and of values for the at least one operating setpoint corresponding to the plurality of operating stages. The order of the operating stages may be modified, on the basis of predefined criteria, depending on how the device being subjected to the technical test responds.

The device subjected to the technical test may in particular be an engine, in particular a liquid-propellant rocket-engine, and more specifically a liquid-propellant rocket-engine having a turbopump feed system.

The present invention also provides an electronic control unit having at least one data output for transmitting at least one operating setpoint to a device and/or to a test bench for testing said device, the unit being configured to control a technical test of the device in application of the above method. This configuration may be a physical configuration of at least one electronic circuit of the electronic control unit, or it may be implemented in a programmable electronic control unit by means of software, i.e. a set of instructions executable by a computer system for performing a technical test method. Such a set of instructions may be contained in a data medium. The term "data medium" designates any data storage device capable of being read by a computer system. Such a data medium may in particular be a magnetic data storage device, such as a magnetic disk or tape, or an optical data storage device such as an optical disk, or an electronic data storage device, such as a volatile or non-volatile electronic memory.

BRIEF DESCRIPTION OF THE DRAWINGS

The invention can be well understood and its advantages appear better on reading the following detailed description of an implementation shown by way of non-limiting example. The description refers to the accompanying drawings, in which.

DETAILED DESCRIPTION OF THE INVENTION

Figure 1:
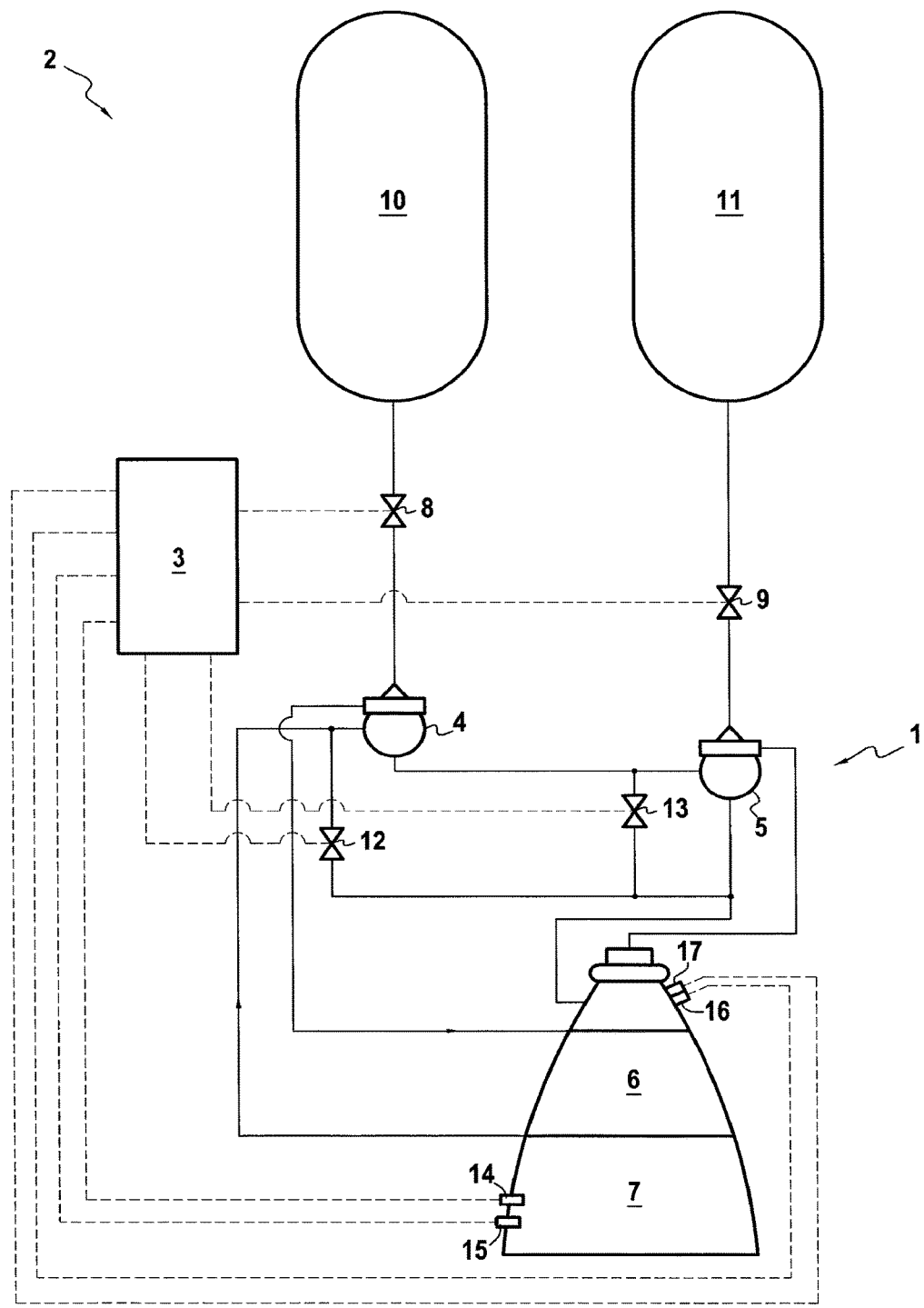
FIG. 1 is a diagram showing a liquid-propellant rocket-engine that is fed by turbopumps on a test bench including an electronic control unit in an embodiment of the present invention.

FIG. 1 shows a liquid-propellant rocket-engine 1 that is fed by turbopumps, the engine being installed on a test bench 2 in which it is connected to an electronic control unit 3 for performing tests using a profile comprising a sequence of a plurality of stages of operation.

In the embodiment shown, the rocket engine 1 is a rocket engine of the "expansion cycle" type, in which the turbopumps 4 and 5 are actuated by one of the propellants after passing through a regenerative heat exchanger 6 adjacent to the walls of the propulsion chamber 7 of the rocket engine 1. Feed valves 8 and 9 are interposed between the tanks 10 and 11 containing the propellants and the corresponding turbopumps 4 and 5, and bypass valves 12 and 13 enable these turbopumps 4 and 5 to be bypassed at least in part by the propellant heated by the heat exchanger 6. Nevertheless, the invention is not limited in any way to testing such rocket engines, and it may equally well be applied to testing other types of engine and indeed other types of device.

In the embodiment shown, the operation of the rocket engine 1 can be controlled by means of the feed valves 8 and 9 and the bypass valves 12 and 13. Each of these valves is connected for this purpose to the electronic control unit 3 in order to receive operating setpoints. The test bench 2 also has sensors, such as for example temperature and pressure sensors 14 and 15 in the propulsion chamber 7, and thrust and vibration sensors 16 and 17 in the supports of the rocket engine 1. These sensors 14, 15, 16, 17 are also connected to the electronic control unit 3 in order to transmit operating parameters of the rocket engine 1 thereto. This set of operating parameters X may include a first parameter A, a second parameter B, and so on.

In the test bench 2, the rocket engine 1 is to be subjected to technical tests comprising a sequence of operating stages $PF_n$ in order to evaluate the operating parameters X of the rocket engine 1 as picked up during each of these operating stages. Each operating stage $PF_n$ in this sequence corresponds to a set of stable setpoint values for the operation of the rocket engine 1 and seeks to reproduce operating points that are pertinent for normal utilization of the rocket engine 1.

Each operating stage needs to be of a duration that is sufficient to collect values that are representative of operating parameters X of the rocket engine 1 during such a test. Simultaneously, an excessive duration for operating stages, and thus for the test, presents drawbacks, in particular in terms of cost. It is therefore necessary to find a compromise for the duration of the stages.

Figure 2:
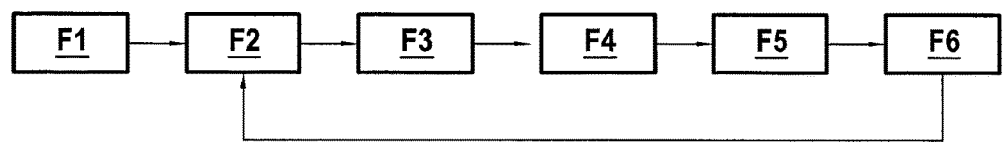
FIG. 2 is a diagram showing the six main functions of a technical test method in an implementation of the invention.

FIG. 2 shows the six main steps of a technical test method that can be performed with the system shown in FIG. 1. In a first function F1 of the method, a table comprising data about each operating stage $PF_n$ is stored in a memory (data storage device or random access memory (RAM)) of the electronic control unit 3. For each operating stage $PF_n$, this table may comprise in particular: an identifier of the operating stage $PF_n$; a first parameter $para_{1,n}$ giving a priority assigned to the stage $PF_n$; operating setpoint values and possibly also monitoring thresholds for the rocket engine 1 and/or the test bench 2; a maximum duration $t_{max,n}$ and possibly a minimum duration $t_{min,n}$ for the stage; at least one end-of-stage criterion, each criterion being associated with a set of physical operating parameters X picked up during the operating stage; a confidence level associated with each set of operating parameters X associated with each end-of-stage criterion; and logic and/or mathematical operators to be applied to said criteria, physical parameters, and/or confidence levels. By way of example, the parameter $para_{1,n}$ giving the priority assigned to each stage $PF_n$ may have a value selected from the values 1, 2, and 3, the value 1 corresponding to the highest priority and the value 3 to the lowest priority. By way of example, the end-of-stage criteria may be criteria concerning the stability of said operating parameters X as sampled during a moving time window.

In a second function F2, the electronic control unit 3 orders the operating stages from the table established in the first function F1 following the priority given to each stage, but while also taking account of the proximity of the values for operating setpoints between successive stages. In certain particular circumstances, two or more operating stages may be associated in order to guarantee that they are executed in a previously imposed order. This second function F2 is executed at the beginning of the technical test, and is then repeated before the end of each operating stage $PF_n$ in order to update the sequence of the stages that remain. In this implementation, the electronic control unit can also take account of the time remaining until the fuel available in the tanks 10 and 11 has been spent.

Thus, by way of example, each operating stage $PF_n$ may be associated with said first parameter $para_{1,n}$, with a second parameter $para_{2,n}$ corresponding to its proximity to a current stage, and with a third parameter $para_{3,n}$ corresponding to the difference between the maximum duration $t_{max,n}$ assigned thereto and the maximum operating duration $t_{cap,n}$ that can be maintained at the rate associated with this operating stage $PF_n$ and with the quantities of the propellants still available in the tanks 10, 11.

In this example, the value of the second parameter $para_{2,n}$ for each stage that remains to be selected for this sorting may be calculated using the following formula, by way of example:

$$para_{2,n} = \sqrt{\alpha_1 \cdot (p_n - p_c)^2 + \alpha_2 \cdot (RM_n - RM_c)^2}$$

where $p_n$ and $RM_n$ are respectively the combustion pressure and the propellant mixing ratio during this operating stage $PF_n$, and $p_c$ and $RM_c$ are respectively the present pressure and the propellant mixing ratio in the propulsion chamber 7, whereas $\alpha_1$ [ALPHA_1] and $\alpha_2$ [ALPHA_2] are coefficients for weighting these physical parameters characterizing the stage.

The value of the third parameter $para_{3,n}$ may be calculated for each operating stage $PF_n$ that remains by subtracting the value of the maximum duration $t_{max,n}$ assigned thereto from the maximum operating duration $t_{cap,n}$ corresponding to this rate of operation and to the remaining propellant capacity.

If for at least one of the remaining operating stages $PF_n$ the value of the third parameter $para_{3,n}$ is negative, thus indicating that the stage in question cannot be maintained for the maximum duration $t_{max,n}$ assigned thereto without running out of propellant, then the remaining stage(s) satisfying this condition may be selected and classified in increasing order of the weighted sum $K_n$ of the first parameter $para_{1,n}$ and of the second parameter $para_{2,n}$ using the following formula:

$$K_n = \beta_1 \cdot para_{1,n} + \beta_2 \cdot para_{2,n}$$

where $\beta_1$ [BETA_1] and $\beta_2$ [BETA_2] are coefficients respectively for weighting said first and second parameters $para_{1,n}$ and $para_{2,n}$.

In contrast, if none of the remaining stages satisfies this condition, then all of the remaining stages are selected and classified by increasing order of the weighted sum $K'_n$ of the values not only of the first parameter $para_{1,n}$ and of the second parameter $para_{2,n}$, but also of the third parameter $para_{3,n}$, using the following formula:

$$K'_n = \beta_1 \cdot para_{1,n} + \beta_2 \cdot para_{2,n} + \beta_3 \cdot para_{3,n}$$

where $\beta_3$ [BETA_3] is a weighting coefficient for said third parameter $para_{3,n}$.

In a third function F3, the electronic control unit 3 generates setpoints for transmitting to the rocket engine 1 and/or to the test bench 2, together with the corresponding monitoring thresholds, on the basis of data stored in the table for the operating stage $PF_n$ in the first position (i.e. presenting the lowest value for the weighted sum $K_n$ or $K'_n$) in the most recent classification established by the second function F2. Thereafter, in the fourth function F4, these setpoints are applied by the electronic control unit 3 in order to control the operation of the rocket engine 1 and/or of the test bench 2.

Concurrently with the fourth function F4, the electronic control unit 3 performs a fifth function F5 of picking up and processing physical parameters X associated with the current operating stage $PF_n$, in particular by means of the sensors 14 to 17. The values of these physical parameters may be picked up with sampling at high frequency or at low frequency depending on the parameter and on its frequency range that is to be analyzed. For example, for signals to be analyzed in a range lower than 25 hertz (Hz), it is possible to apply low frequency sampling at approximately 100 points per second (pt/s), whereas for signals that need to be analyzed over a range that may be substantially higher than 25 Hz, and that may even reach 5000 Hz, it is possible to apply sampling at a high frequency of about 25,000 pt/s.

In this fifth function F5, a confidence level $CL_X$ in the range 0 to 1 may be associated with each signal corresponding to one or more physical parameters X, as a function in particular of an estimated reliability of the sensor and/or of algorithms used for the processing of each signal. The value of each of these confidence levels $CL_X$ may be predetermined, or it may be calculated in real time as a function of a noise level and/or a bias level in the signal corresponding to the associated physical parameter, and/or as a function of the difference between the signal and a predetermined threshold. Thus, by way of example, it is possible to allocate said confidence level $CL_X$ to each signal sampled at low frequency as a function of the level of noise in the signal, where noise is measured by means of the dispersion $\sigma$ [SIGMA] of the signal in a moving time window, and to allocate said confidence level $CL_X$ to each signal sampled at high frequency as a function of the asymmetric uncertainty coefficient $\gamma_1$ [GAMMA_1] of the signal in a moving time window.

Figure 3A:
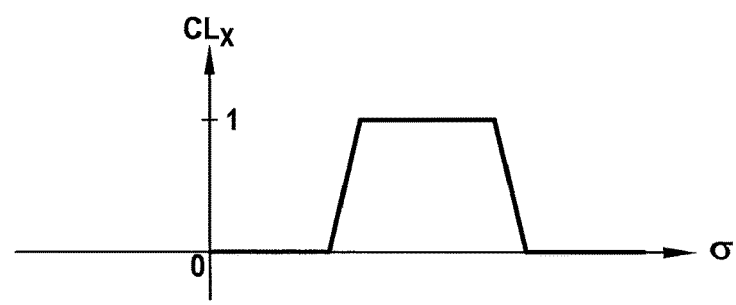
FIG. 3A is a graph showing the level of confidence attributed to a signal as a function of the dispersion of noise in the signal in a moving time window.

The dispersion $\sigma$ [SIGMA] of a signal and the confidence level $CL_X$ allocated to the signal may comply with the relationship shown in FIG. 3A, for example.

In this example, a high confidence level $CL_X$ is not allocated to the signal if its dispersion $\sigma$ [SIGMA] is too great, indicating a high level of noise, or on the contrary if it is too small, indicating that the signal is too constant (dead signal).

Figure 3B:
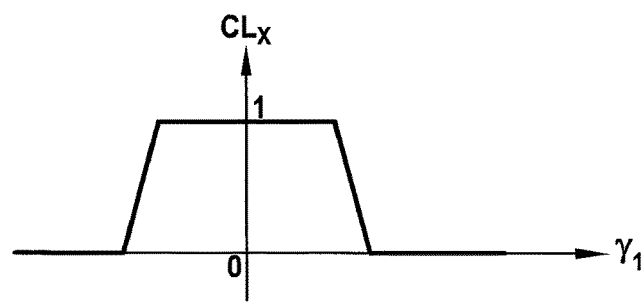
FIG. 3B is a graph showing the level of confidence attributed to a signal as a function of its asymmetric uncertainty coefficient in a moving time window.

The asymmetric uncertainty coefficient $\gamma_1$ [GAMMA_1] of a signal and the confidence level $CL_X$ allocated to the signal may, for their part, comply with the function shown in FIG. 3B, for example. In this example, a high confidence level $CL_X$ is not allocated to this signal if the absolute value of its asymmetric uncertainty coefficient $\gamma_1$ [GAMMA_1] is too high.

It is also possible to associate a confidence level $CL_{set}$ to a set of physical parameters X, with this confidence level $CL_{set}$ being calculated by the electronic control unit 3 on the basis of the values of the confidence level $CL_X$ individually associated with the physical parameters X of the set. This calculation may be performed in particular by applying fuzzy logic operators to the values of the confidence levels $CL_X$ individually associated with the physical parameters X of the set. Among the operators that may be used, there are in particular probabilistic operators, and in particular the probabilistic t-norm and t-conorm operators. The first corresponds to the product of two terms of the operation, while the second corresponds to subtracting the product of the two terms of the operation from the sum of the two terms of the operation.

Thus, by way of example, by applying the t-norm operator, the confidence levels $CL_A$, $CL_B$, and $CL_C$ of three signals corresponding respectively to physical parameters A, B, and C contributing to a single end-of-stage criterion are multiplied together to obtain the confidence level $CL_{set}$ associated with this set of physical parameters, and thus with a corresponding end-of-stage criterion.

Finally, in a sixth function F6, the electronic control unit 3 verifies whether the at least one end-of-stage criterion is satisfied and whether at least one confidence level associated with this criterion has reached a minimum threshold. If the at least one criterion is satisfied and the confidence level has reached the minimum threshold, possibly for at least some minimum length of time, the current stage can be finalized and the electronic control unit 3 can return to the second function F2 in which the table is re-arranged after eliminating the stage that has been finalized, after which the third function F3 generates the operating setpoints that correspond to the following stage. Finalizing the current stage may also depend on a minimum duration for that stage, so that the operating stage is not finalized too quickly.

In contrast, if the at least one end-of-stage criterion is not satisfied and/or if the at least one confidence level associated with this criterion has not reached its minimum threshold, the stage may be continued until a predetermined maximum duration is reached.

Although the present invention is described with reference to a specific implementation, it is clear that various modifications and changes may be made on these implementations without going beyond the general ambit of the invention as defined by the claims. In addition, individual characteristics of the various implementations mentioned may be combined in additional implementations. Consequently, the description and the drawings should be considered in a sense that is illustrative rather than restrictive.

The invention claimed is:

1. A technical test method for testing a propulsion engine, the technical test method comprising:
operating the propulsion engine at an operating stage corresponding to a stable value of at least one operating setpoint for at least one of the propulsion engine and a test bench for testing the propulsion engine; and
picking up a plurality of physical parameters of the propulsion engine, including at least one among temperature, pressure, thrust, and vibration, during the operating the propulsion engine at said operating stage using sensors,
wherein the operating the propulsion engine at said operating stage is finalized before a maximum duration threshold if a criterion associated with the plurality of physical parameters picked up during the operating stage is satisfied and if a confidence level associated with the plurality of physical parameters reaches at least a predetermined threshold, each physical parameter of the plurality of physical parameters being associated with a respective confidence level, and the confidence level associated with the plurality of physical parameters as a whole being a function of the respective confidence levels associated with the plurality of physical parameters, and
wherein said function comprises the product of multiplying together the respective confidence levels associated with two physical parameters of said plurality of physical parameters.

2. The technical test method according to claim 1, wherein the operating the propulsion engine at said operating stage is finalized prior to a maximum duration threshold if said criterion is satisfied and if said confidence level reaches at least said predetermined threshold for at least a predetermined minimum duration.

3. The technical test method according to claim 1, wherein said function comprises subtracting said product of multiplying together the respective confidence levels associated with two physical parameters of said plurality of physical parameters from the sum of the same two respective confidence levels.

4. The technical test method according to claim 1, wherein at least one of the respective confidence levels is predetermined.

5. The technical test method according to claim 1, wherein at least one respective confidence level associated with a physical parameter is calculated as a function of a noise level in a signal corresponding to the associated physical parameter.

6. The technical test method according to claim 1, wherein at least one respective confidence level associated with a physical parameter is calculated as a function of an asymmetric uncertainty coefficient of a signal corresponding to the associated physical parameter.

7. The technical test method according to claim 1, wherein at least one respective confidence level associated with a physical parameter is calculated as a function of a difference between a value of the associated physical parameter and a predetermined threshold.

8. The technical test method according to claim 1, wherein each of said respective confidence levels has a value lying in the range 0 to 1.

9. The technical test method according to claim 1, further comprising:
ordering a sequence of a plurality of different operating stages, each of the operating stages corresponding to a stable value of at least one operating setpoint for at least one of the propulsion engine and the test bench for testing the propulsion engine.

10. The technical test method according to claim 9, wherein the order of the operating stages in said sequence is established on the basis of at least one priority assigned to each operating stage, and of values for the at least one operating setpoint corresponding to the plurality of operating stages.

11. A technical test method for testing a propulsion engine, the technical test method comprising:
ordering a sequence of a plurality of different operating stages, each of the operating stages corresponding to a stable value of at least one operating setpoint for at least one of the propulsion engine and a test bench for testing the propulsion engine, wherein an order of the operating stages in said sequence is established on the basis of at least one priority assigned to each operating stage, and of values for the at least one operating setpoint corresponding to the plurality of operating stages,
operating the propulsion engine at each operating stage of the plurality of different operating stages; and
picking up a plurality of physical parameters of the propulsion engine, including at least one among temperature, pressure, thrust, and vibration, during the operating the propulsion engine at each operating stage using sensors,
wherein the operating the propulsion engine at each operating stage is finalized before a maximum duration threshold if a criterion associated with the plurality of physical parameters is satisfied and if a confidence level associated with the plurality of physical parameters reaches at least a predetermined threshold, each physical parameter of the plurality of physical parameters being associated with a respective confidence level, and the confidence level associated with the set of physical parameters as a whole being a function of the respective confidence levels associated with said plurality of physical parameters.

12. A non-transitory computer readable medium containing a set of instructions executable by a computer system to perform the technical test method of claim 11.

13. A technical test method for testing a propulsion engine, the technical test method comprising:
operating the propulsion engine at an operating stage corresponding to a stable value of at least one operating setpoint for at least one of the propulsion engine and a test bench for testing the propulsion engine; and
picking up a plurality of physical parameters of the propulsion engine, including at least one among temperature, pressure, thrust, and vibration, during the operating the propulsion engine at said operating stage using sensors,
wherein the operating the propulsion engine at said operating stage is finalized before a maximum duration threshold if a criterion associated with the plurality of physical parameters picked up during the operating stage is satisfied and if a confidence level associated with the plurality of physical parameters reaches at least a predetermined threshold, each physical parameter of the plurality of physical parameters being associated with a respective confidence level, and the confidence level associated with the set of physical parameters as a whole being a function of the respective confidence levels associated with said plurality of physical parameters, and
wherein at least one of the respective confidence levels is predetermined.

14. A non-transitory computer readable medium containing a set of instructions executable by a computer system to perform the technical test method of claim 13.

15. A technical test method for testing a propulsion engine, the technical test method comprising:
   operating the propulsion engine at an operating stage corresponding to a stable value of at least one operating setpoint for at least one of the propulsion engine and a test bench for testing the propulsion engine; and
   picking up a plurality of physical parameters of the propulsion engine, including at least one among temperature, pressure, thrust, and vibration, during the operating the propulsion engine at said operating stage using sensors,
   wherein the operating the propulsion engine at said operating stage is finalized before a maximum duration threshold if a criterion associated with the plurality of physical parameters picked up during the operating stage is satisfied and if a confidence level associated with the plurality of physical parameters reaches at least a predetermined threshold, each physical parameter of the plurality of physical parameters being associated with a respective confidence level, and the confidence level associated with the set of physical parameters as a whole being a function of the respective confidence levels associated with said plurality of physical parameters, and
   wherein at least one respective confidence level associated with a physical parameter is calculated as a function of a noise level in a signal corresponding to the associated physical parameter.

16. A non-transitory computer readable medium containing a set of instructions executable by a computer system to perform the technical test method of claim 15.

17. A technical test method for testing a propulsion engine, the technical test method comprising:
   operating the propulsion engine at an operating stage corresponding to a stable value of at least one operating setpoint for at least one of the propulsion engine and a test bench for testing the propulsion engine; and
   picking up a plurality of physical parameters of the propulsion engine, including at least one among temperature, pressure, thrust, and vibration, during the operating the propulsion engine at said operating stage using sensors,
   wherein the operating the propulsion engine at said operating stage is finalized before a maximum duration threshold if a criterion associated with the plurality of physical parameters picked up during the operating stage is satisfied and if a confidence level associated with the plurality of physical parameters reaches at least a predetermined threshold, each physical parameter of the plurality of physical parameters being associated with a respective confidence level, and the confidence level associated with the set of physical parameters as a whole being a function of the respective confidence levels associated with said plurality of physical parameters, and
   wherein at least one respective confidence level associated with a physical parameter is calculated as a function of an asymmetric uncertainty coefficient of a signal corresponding to the associated physical parameter.

18. A non-transitory computer readable medium containing a set of instructions executable by a computer system to perform the technical test method of claim 17.

19. A technical test method for testing a propulsion engine, the technical test method comprising:
   operating the propulsion engine at an operating stage corresponding to a stable value of at least one operating setpoint for at least one of the propulsion engine and a test bench for testing the propulsion engine; and
   picking up a plurality of physical parameters of the propulsion engine, including at least one among temperature, pressure, thrust, and vibration, during the operating the propulsion engine at said operating stage using sensors,
   wherein the operating the propulsion engine at said operating stage is finalized before a maximum duration threshold if a criterion associated with the plurality of physical parameters picked up during the operating stage is satisfied and if a confidence level associated with the plurality of physical parameters reaches at least a predetermined threshold, each physical parameter of the plurality of physical parameters being associated with a respective confidence level, and the confidence level associated with the set of physical parameters as a whole being a function of the respective confidence levels associated with said plurality of physical parameters, and
   wherein at least one respective confidence level associated with a physical parameter is calculated as a function of a difference between a value of the associated physical parameter and a predetermined threshold.

20. A non-transitory computer readable medium containing a set of instructions executable by a computer system to perform the technical test method of claim 19.

21. A non-transitory computer readable medium containing a set of instructions executable by a computer system to perform the technical test method of claim 1.

* * * * *